B. ERBE.

Securing Cap-Plates to Lock-Cases.

No. 5,849. Reissued April 28, 1874.

WITNESSES
F. W. Ritter Jr
James L. Kay

INVENTOR
Barthel Erbe
by Bakewell & Kerr
Attorneys

AM. PHOTO-LITHOGRAPHIC CO. N.Y. (OSBORNE'S PROCESS)

UNITED STATES PATENT OFFICE.

BARTHEL ERBE, OF PITTSBURG, PENNSYLVANIA.

IMPROVEMENT IN SECURING CAP-PLATES TO LOCK-CASES.

Specification forming part of Letters Patent No. 147,051, dated February 3, 1874; reissue No. 5,849, dated April 28, 1874; application filed March 30, 1874.

*To all whom it may concern:*

Be it known that I, BARTHEL ERBE, of Pittsburg, in the county of Allegheny and State of Pennsylvania, have invented a new and useful Improvement in Securing Cap-Plates to Lock-Cases; and I do hereby declare the following to be a full, clear, and exact description thereof, reference being had to the accompanying drawing forming a part of this specification, in which—

Figure 1:
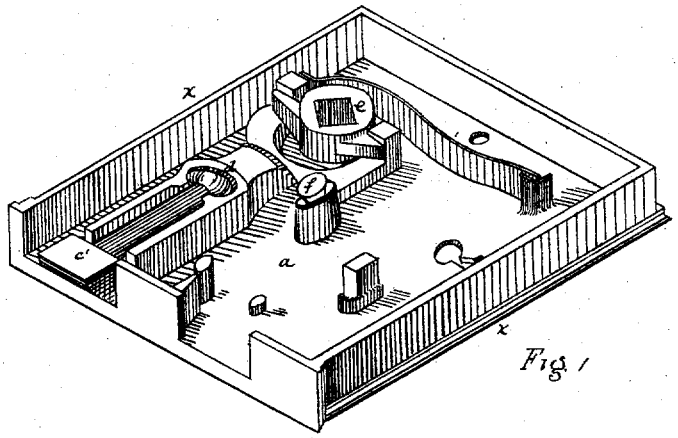
Figure 2:
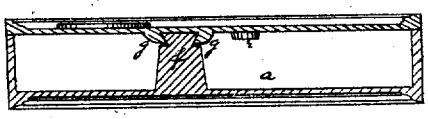
Figure 3:
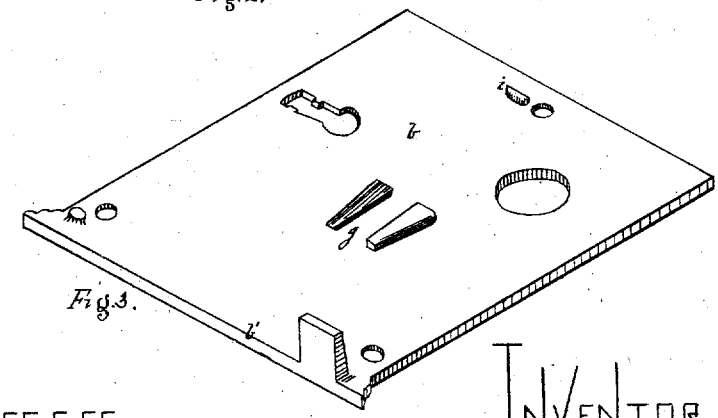

Figure 1 is a perspective view of the latch portion of the case with the cap-plate removed. Fig. 2 is a section through *x x*, Fig. 1; and Fig. 3 is a view of the under side of the cap.

My invention consists in a lock, the case and cap of which are fastened together by a hook on one part sliding into and engaging a catch on the other, such engaging-points being entirely inside of the lock and rigidly attached thereto.

To enable others skilled in the art to make and use my improvement, I will describe its construction and manner of use.

The parts contained in the case *a* are of the usual construction. *b* represents the cap; *c*, the latch-bolt, which is attached to the yoke *d*, and provided with a round shank, by which it may be reversed therein. The follower *e* operates in the usual way. Heretofore the cap *b* has been secured upon the case *a* by means of a screw or other device extending through it. Instead of this, I form upon the case *a* a T-head, *f*, the upper face of which stands parallel to the edges of the case. Upon the opposite portion of the cap *b* I form a slide or catch, *g*, composed of two overlapping lips. At the rear end of the cap *b* is a stop, *i*, having an inclined inner side. The front edge *b'* of the cap *b* forms one of the bearings of the latch-head *c'*. In order to attach the cap I slide it onto the case *a* from its rear end forward. This causes the T-head *f* to engage the catch *g*, and thereby secure these parts together. When the cap has been pushed forward its full extent, the inclined stop *i*, sliding on the rear edge of the case, drops into it, and holds the cap from any lateral displacement. If it is desired to remove the cap, it is only necessary to spring it slightly up at its back end, when the stop *i* will slip over the rear edge of the case, and permit the withdrawal of the cap. The catch *g* is made of sufficient length, and the stop *i* is placed at a sufficient distance from the rear edge of the case, to allow the cap *b* to be moved back a limited distance. This removes the bearing from one side of the latch-head *c'*, so that the latter may be reversed at pleasure. The portion of the front edge of the case *a*, which forms the bearing of one or two sides of the latch-head *c'*, may be cast along with the cap, as shown in Fig. 3, so that by the lateral movement of the cap upon its slide the latch-head *c'* will be freed upon two sides, making the operation of reversing still easier.

The engaging points or fastening may be made at any suitable or convenient part of the inside of the lock.

This method of fastening the case together enables me to dispense with the screw-hole heretofore necessary, saves much trouble in joining the parts and in reversing the latch, is a secure fastening, and gives a neater and cheaper article.

The engaging devices may be cast together with the case and cap, thereby saving the labor and expense of a subsequent operation, such as drilling and tapping the screw-hole, heretofore necessary.

But I do not desire to limit my invention to its use in a lock the case of which is cast, nor to the making of the engaging devices of one piece with the case, nor to any particular shape of engaging pieces.

What I claim as my invention, and desire to secure by Letters Patent, is—

A lock, the case and cap of which are fastened together by a hook on one part sliding into and engaging a catch on the other, such engaging-points being entirely inside the lock and rigidly attached thereto, substantially as described.

In witness whereof I, the said BARTHEL ERBE, have hereunto set my hand.

BARTHEL ERBE.

Witnesses:
W. BAKEWELL,
T. B. KERR.